No. 713,051. Patented Nov. 11, 1902.
J. F. BLACK.
MUSIC HOLDER AND TURNER.
(Application filed Aug. 1, 1902.)
(No Model.)

Witnesses
E. F. Stewart
C. H. Woodward

J. F. Black, Inventor
by C. A. Snow & Co.
Attorneys

UNITED STATES PATENT OFFICE.

JOHN F. BLACK, OF ROCKWALL, TEXAS, ASSIGNOR OF ONE-FOURTH TO GEORGE D. GALLOWAY, OF LEONARD, TEXAS.

MUSIC HOLDER AND TURNER.

SPECIFICATION forming part of Letters Patent No. 713,051, dated November 11, 1902.

Application filed August 1, 1902. Serial No. 118,000. (No model.)

*To all whom it may concern:*

Be it known that I, JOHN F. BLACK, a citizen of the United States, residing at Rockwall, in the county of Rockwall and State of Texas, have invented a new and useful Music Holder and Turner, of which the following is a specification.

This invention relates to devices employed for the purpose of turning the leaves of music or the leaves of books, more particularly music-books, and has for its object the production of an extremely simple device which may be supported upon the music-rack of a piano, organ, or similar instrument or which may be supported upon music-racks employed in orchestras or by individual musicians and by which the leaves of the music may be independently supported in position to be independently turned.

The invention consists in certain novel features of the construction, as hereinafter shown and described, and specifically pointed out in the claim.

Figure 1:
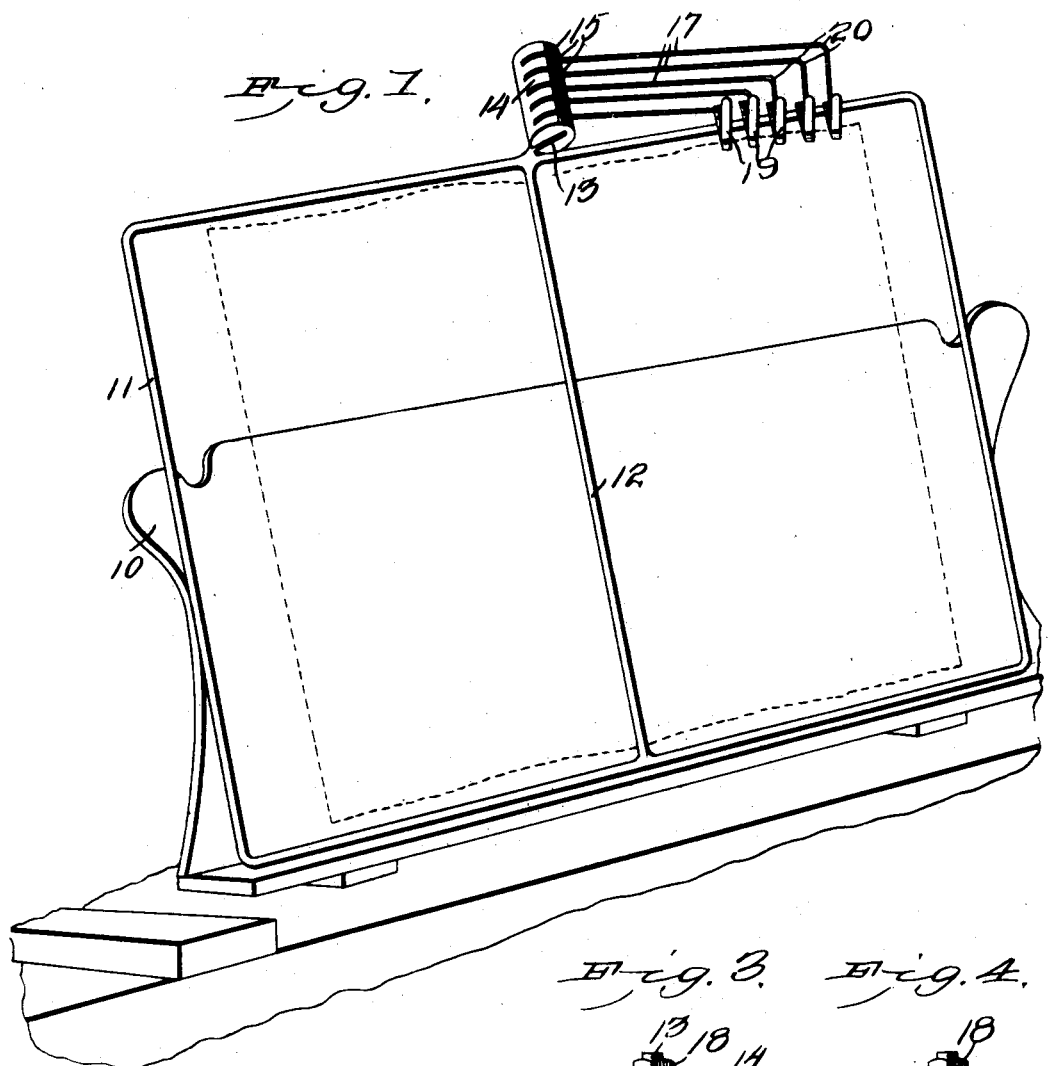
Figure 2:
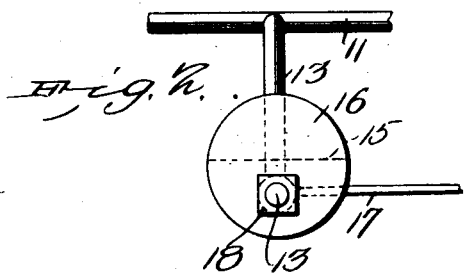
Figures 3, 4:
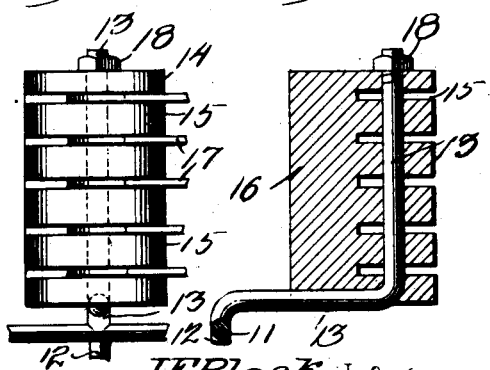

In the drawings illustrative of the invention, Figure 1 is a perspective view of the invention applied. Fig. 2 is an enlarged detail plan view. Fig. 3 is an enlarged detailed front view; and Fig. 4 is a vertical sectional view, enlarged, of the leaf-supporting-arm head detached.

For the purpose of illustration the improved device is shown resting in position upon a conventional music-rack, (indicated at 10.)

The improved device consists in an open framework 11, preferably rectangular in outline and with a central vertical brace member 12, connecting the upper and lower members of the frame, as shown in Fig. 1. The vertical member 12 is extended outwardly at its upper end above the frame 11 for a short distance and thence turned upwardly, as indicated at 13.

The vertical portion 13 forms a stud to support a cylindrical member 14, preferably of wood, and provided with a plurality of transverse gains 15, partially severing the cylindrical member and leaving the solid rear portion 16, as shown in Fig. 4. The vertical portion or stud 13 passes upward through the gains 15, as shown in Fig. 4, and provides bearings within the gains for a plurality of rods 17, the rods provided with eyes on their inner ends, revolubly engaging the stud 13 within the gains. By this means it will be obvious that the rods 17 may be independently revolved in horizontal alinement with the frame 11 and at right angles to the stud 13.

The upper end of the stud 13 is threaded and provided with a nut 18, while the horizontal portion engages a recess in the lower end of the cylindrical member 14, as indicated in Fig. 4. By this means it will be obvious that when the nut is set down in position upon the cylindrical member the latter will be firmly held in place and prevented from turning. This makes a very simple and firm coupling means between the cylindrical member and the frame of the device.

The outer ends of the arms 17 are turned downward in consecutive order or spaced apart, as shown, and each downwardly-depending end independently provided with a spring-clip 19, as shown. The clips are adapted to be attached to the separate leaves of music or the separate leaves of books resting upon the rack, as will be understood. The lowermost arm 17 being the shortest and the uppermost arm being the longest, with the intermediate arms successively graduated as to length, it will be obvious that if the lowermost leaf or the last one which is to be turned be connected to the clip upon the shortest arm 17 and the remaining leaves connected in consecutive order to the remaining clips, the leaves may be independently and consecutively turned by the performer placing his finger upon the elbows 20 of the arm 17 and swinging the arm around to the reverse position. By this simple means the performer can very quickly turn the leaves as required without the loss of time required to grasp the individual leaves by the fingers, and which is such an annoying requirement. With this simple device the leaves may be turned with a motion as quickly performed as that required to draw one of the stops of an organ, for instance, or many of the various quick motions required in playing an instrument.

It will be noted that the elbow 20, which is to be engaged by the finger of the performer, is at all times the outermost one, so that no time need be lost in selecting the proper arm to be actuated; but the performer need only operate the elbow which for the time being is outermost. This is an important feature of the invention and greatly simplifies the construction. It will also be noted that the device is operative by reversing the order in which the clips are engaged with the leaves to be turned; but in that event it will be necessary to engage the arms in the reverse order—that is to say, engaging the innermost arms consecutively instead of the outermost arm; but this would not be as convenient and would require the performer to spend some time in selecting the proper arm to be operated.

The arm 17 may be of any desired length and of any required size.

The clips 19 may be of any suitable structure, and I do not wish to be limited to any specific form of clip, as I am aware that many different forms of these devices may be employed.

The metal parts of the device will be plated or otherwise ornamented, and the cylindrical member 14 will be painted or otherwise ornamented, as may be desired.

The nut 18 may be in the form of an ornamental cap, if preferred.

The frame 11 may be of any required size to adapt the device to the sizes of the sheets or leaves to be supported and turned and may be provided with transverse, diagonal, or otherwise-arranged braces or additional members, as required, without departing from the principle of the invention or sacrificing any of its advantages.

The cylindrical member 14 is shown extending above the frame 11, but might be arranged below the frame, so that the rods 17 and their spring-clips 19 would operate upon the lower sides of the sheets of music, if preferred, and this modification would not be a departure from the principle of the invention or sacrifice any of its advantages.

Having thus described my invention, what I claim is—

In a music-leaf holder and turner, a supporting-frame having a stud extending laterally and thence vertically therefrom, a cylindrical member provided with transverse-spaced apertures and engaging said stud and having a recess embracing the laterally-extended portion thereof, means for rigidly securing said cylindrical member upon said stud, a plurality of arms engaging said stud within said apertures for pivotal movement and adapted for respective engagement with the sheets of music, substantially as described.

In testimony that I claim the foregoing as my own I have hereto affixed my signature in the presence of two witnesses.

JOHN F. BLACK.

Witnesses:
J. C. BARRINGER,
T. B. RIDGELL.